United States Patent
Kumar et al.

(10) Patent No.: US 9,745,066 B2
(45) Date of Patent: Aug. 29, 2017

(54) ADJUSTABLE SEAT ASSEMBLY

(71) Applicants: Goodrich Aerospace Services Private Limited, Bangalore, Karnataka (IN); AMI Industries, Inc., Colorado Springs, CO (US)

(72) Inventors: Pavan Kumar Krishna Kumar, Karnataka (IN); Mahesh Virupaxi Hosmani, Karnataka (IN); Akhil Rajagopal Kozhipuram, Karnataka (IN); David A. Ross, Colorado Springs, CO (US); Troy Brodish, Black Forest, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 98 days.

(21) Appl. No.: 14/844,091

(22) Filed: Sep. 3, 2015

(65) Prior Publication Data
US 2017/0066535 A1    Mar. 9, 2017

(51) Int. Cl.
*B64D 11/06* (2006.01)
*B60N 2/06* (2006.01)
(Continued)

(52) U.S. Cl.
CPC .............. *B64D 11/064* (2014.12); *B60N 2/06* (2013.01); *B60N 2/12* (2013.01); *B60N 2/16* (2013.01); *B60N 2/1695* (2013.01); *B60N 2/442* (2013.01); *B64D 11/0689* (2013.01); *B64D 11/0696* (2013.01); *B60N 2002/0216* (2013.01); *B60N 2002/4455* (2013.01)

(58) Field of Classification Search
CPC .... B64D 11/064; B64D 11/0696; B60N 2/12; B60N 2/442; B60N 2002/4455; B60N 2/10; B60N 2/07; B60N 2/427; B60N 2/42709; B60N 2/42745; B60N 2/22; B60N 2/06; B60N 2/4838; B60N 2/4808
See application file for complete search history.

(56) References Cited

U.S. PATENT DOCUMENTS 2,153,763 A * 4/1939 Kuhler .................... B60N 2/10
                                                            248/395
2,313,023 A   3/1943 Ruegger
(Continued)

FOREIGN PATENT DOCUMENTS

CA         2747256 C      7/2010
WO      2013017633 A1     2/2013

OTHER PUBLICATIONS

Extended European Search Report for application No. 16187281.7-1754 issued Feb. 3, 2017 (5 pages).

*Primary Examiner* — Beth Stephan
(74) *Attorney, Agent, or Firm* — Cantor Colburn LLP (57) ABSTRACT

A seat adjustment mechanism for an adjustable seat assembly includes an arcuate tilt column; a lift column; a first tilt slider block detachably engaged to the lift column and slideably engaged to the tilt column for moving the lift column between a plurality of tilt positions; and a first lift slider block slideably engaged to the lift column for moving between a plurality of lift positions independent of the plurality of tilt positions. The slider blocks, the lift columns, the tilt columns and the cross brace may be made of dissimilar materials and/or are easily replaced with alternative components.

20 Claims, 6 Drawing Sheets

(51) Int. Cl.
   *B60N 2/16* (2006.01)
   *B60N 2/12* (2006.01)
   *B60N 2/44* (2006.01)
   *B60N 2/02* (2006.01)

(56) References Cited

U.S. PATENT DOCUMENTS

| | | | | |
|---|---|---|---|---|
| 3,985,388 A * | 10/1976 | Hogan | | B60N 2/163 |
| | | | | 244/122 R |
| 4,150,805 A * | 4/1979 | Mazelsky | | B64D 25/04 |
| | | | | 244/122 R |
| 4,383,714 A * | 5/1983 | Ishida | | A47C 3/0257 |
| | | | | 297/261.3 |
| 4,423,848 A * | 1/1984 | Mazelsky | | B64D 25/04 |
| | | | | 244/122 R |
| 5,108,149 A * | 4/1992 | Ambasz | | A47C 7/443 |
| | | | | 297/297 |
| 5,193,880 A | 3/1993 | Keusch et al. | | |
| 5,582,460 A | 12/1996 | Schultz | | |
| 5,676,336 A * | 10/1997 | Nefy | | B64D 25/04 |
| | | | | 244/118.6 |
| 6,378,943 B1 | 4/2002 | Beggs et al. | | |
| 6,523,898 B1 | 2/2003 | Ball et al. | | |
| 7,007,965 B2 * | 3/2006 | Bernatsky | | A61G 5/12 |
| | | | | 280/250.1 |
| 7,008,015 B2 * | 3/2006 | Bischoff | | A47C 1/022 |
| | | | | 248/622 |
| 7,628,357 B2 * | 12/2009 | Mercier | | B60N 2/42736 |
| | | | | 244/122 R |
| 7,744,155 B2 * | 6/2010 | List | | B60N 2/4242 |
| | | | | 244/122 R |
| 8,061,755 B2 * | 11/2011 | Brendel | | A47C 3/0257 |
| | | | | 296/65.15 |
| 8,235,407 B2 * | 8/2012 | Cerreto | | A61G 5/1075 |
| | | | | 280/250.1 |
| 8,408,643 B2 * | 4/2013 | Honnorat | | B64D 11/0689 |
| | | | | 244/122 R |
| 2002/0149247 A1 | 10/2002 | Diffrient | | |
| 2011/0079681 A1* | 4/2011 | Honnorat | | B64D 11/0689 |
| | | | | 244/122 R |
| 2014/0361592 A1 | 12/2014 | Kuno | | |
| 2015/0145295 A1* | 5/2015 | Cecinas | | B64D 11/0619 |
| | | | | 297/216.1 |

* cited by examiner

ADJUSTABLE SEAT ASSEMBLY

BACKGROUND

The present disclosure relates to an adjustable seat assembly and, more particularly, to a seat adjusting mechanism of the assembly with detachable components.

Traditional adjustable seat assemblies are used in a wide range of application including automotive and aviation applications. How a seat assembly may articulate is dependent upon packaging requirements and the specific needs of an occupant. Many seat assemblies are cumbersome, heavy, expensive to manufacture or maintain, are limited in applications, and/or are difficult to operate amongst other disadvantages. Continued adjustable seat assembly improvements is desirable.

SUMMARY

A seat adjustment mechanism according to one, non-limiting, embodiment of the present disclosure includes an arcuate tilt column; a lift column; a first tilt slider block detachably engaged to the lift column and slideably engaged to the tilt column for moving the lift column between a plurality of tilt positions; and a first lift slider block slideably engaged to the lift column for moving between a plurality of lift positions independent of the plurality of tilt positions.

Additionally to the foregoing embodiment, the tilt column extends along a centerline having a consistent radius and a bore in the first tilt slider block is centered to and co-extends along the centerline.

In the alternative or additionally thereto, in the foregoing embodiment, the mechanism includes a second tilt slider block spaced from the first tilt slider block along the arcuate tilt column, wherein a bore in the second tilt slider block is centered to and co-extends along the centerline.

In the alternative or additionally thereto, in the foregoing embodiment, the mechanism includes a first indexing feature carried between the first tilt slider block and the arcuate tilt column for positioning the lift column in any one of the plurality of tilt positions.

In the alternative or additionally thereto, in the foregoing embodiment, the first indexing feature includes a pin moveably supported by the first tilt slider block and a plurality of holes in and spaced along the tilt column for selected receipt of the pin, and wherein each hole is associated with a respected one of the plurality of tilt positions.

In the alternative or additionally thereto, in the foregoing embodiment, the mechanism includes a second indexing feature carried between the first lift slider block and the lift column for positioning the first lift slider block in any one of the plurality of lift positions.

In the alternative or additionally thereto, in the foregoing embodiment, the second indexing feature includes a pin moveably supported by the first lift slider block and a plurality of holes in and spaced along the lift column for selected receipt of the pin, and wherein each hole is associated with a respected one of the plurality of lift positions.

In the alternative or additionally thereto, in the foregoing embodiment, the mechanism includes a second arcuate tilt column laterally spaced from the arcuate tilt column; a second lift column laterally spaced from the lift column; a third tilt slider block detachably engaged to the second lift column and slideably engaged to the second arcuate tilt column for moving the second lift column between the plurality of tilt positions; and a cross brace detachably engaged between the first and third tilt slider blocks for stabilization.

In the alternative or additionally thereto, in the foregoing embodiment, the mechanism includes a second arcuate tilt column laterally spaced from the arcuate tilt column; a second lift column laterally spaced from the lift column; a third tilt slider block detachably engaged to the second lift column and slideably engaged to the second arcuate tilt column for moving the second lift column between the plurality of tilt positions; a third indexing feature carried between the third tilt slider block and the second arcuate tilt column for positioning the second lift column in any one of the plurality of tilt positions; and a sync rod supported by the first and third tilt slider blocks and operatively engaged to the first and third indexing features.

In the alternative or additionally thereto, in the foregoing embodiment, the mechanism includes a second arcuate tilt column laterally spaced from the arcuate tilt column; a second lift column laterally spaced from the lift column; a second lift slider block slideably engaged to the second lift column for moving between the plurality of lift positions independent of the plurality of tilt positions; a fourth indexing feature carried between the second lift slider block and the second lift column for positioning the lift column in any one of the plurality of lift positions; and a sync rod supported by the first and second lift slider blocks and operatively engaged to the second and fourth indexing features.

In the alternative or additionally thereto, in the foregoing embodiment, the tilt and lift slider blocks each include an anti-friction sleeve.

An adjustable seat assembly according to another, non-limiting, embodiment includes a seat adjustment mechanism including an arcuate tilt column, a lift column, a first tilt slider block detachably engaged to the lift column and slideably engaged to the tilt column for moving the lift column between a plurality of tilt positions, and a first lift slider block slideably engaged to the lift column for moving between a plurality of lift positions independent of the plurality of tilt positions; a bucket seat detachably engaged to the first lift slider block for moving between the plurality of lift positions and the plurality of tilt positions; and a base constructed and arranged to move forward and aft, wherein the arcuate tilt column is detachably engaged to and moves forward and aft with the base.

Additionally to the foregoing embodiment, the assembly is a helicopter seat assembly.

In the alternative or additionally thereto, in the foregoing embodiment, movement of the lift column between the plurality of tilt positions is in an arcuate direction, and movement of the first lift slider block between the plurality of lift positions is in a linear lift direction that is generally tangential to the arcuate direction.

In the alternative or additionally thereto, in the foregoing embodiment, movement of the base forward and aft is in a third direction that traverses the arcuate and lift directions.

In the alternative or additionally thereto, in the foregoing embodiment, the seat adjustment mechanism includes a first indexing feature carried between the first tilt slider block and the arcuate tilt column for positioning the lift column in any one of the plurality of tilt position, and a second indexing feature carried between the first lift slider block and the lift column for positioning the lift column in any one of the plurality of lift positions.

In the alternative or additionally thereto, in the foregoing embodiment, the seat adjustment mechanism includes a second arcuate tilt column laterally spaced from the arcuate tilt column, a second lift column laterally spaced from the lift column, a third tilt slider block detachably engaged to the second lift column and slideably engaged to the second arcuate tilt column for moving the second lift column between the plurality of tilt positions, a cross brace detachably engaged between the first and third tilt slider blocks for stabilization, a third indexing feature carried between the third tilt slider block and the second arcuate tilt column for positioning the second lift column in any one of the plurality of tilt positions, and a sync rod removeably supported by the first and third tilt slider blocks and operatively engaged to the first and third indexing features.

In the alternative or additionally thereto, in the foregoing embodiment, the slider blocks, the lift columns, the tilt columns and the cross brace are all made of dissimilar materials.

In the alternative or additionally thereto, in the foregoing embodiment, the seat adjustment mechanism includes a second arcuate tilt column laterally spaced from the arcuate tilt column, a second lift column laterally spaced from the lift column, a second lift slider block slideably engaged to the second lift column for moving between the plurality of lift positions independent of the plurality of tilt positions, a fourth indexing feature carried between the second lift slider block and the second lift column for positioning the lift column in any one of the plurality of lift positions, and a sync rod supported by the first and second lift slider blocks and operatively engaged to the second and fourth indexing features.

In the alternative or additionally thereto, in the foregoing embodiment, the tilt column is made of 4130 steel, the lift column is made of 4340 steel, and the tilt and lift slider blocks are made of 2024-T351 aluminum The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
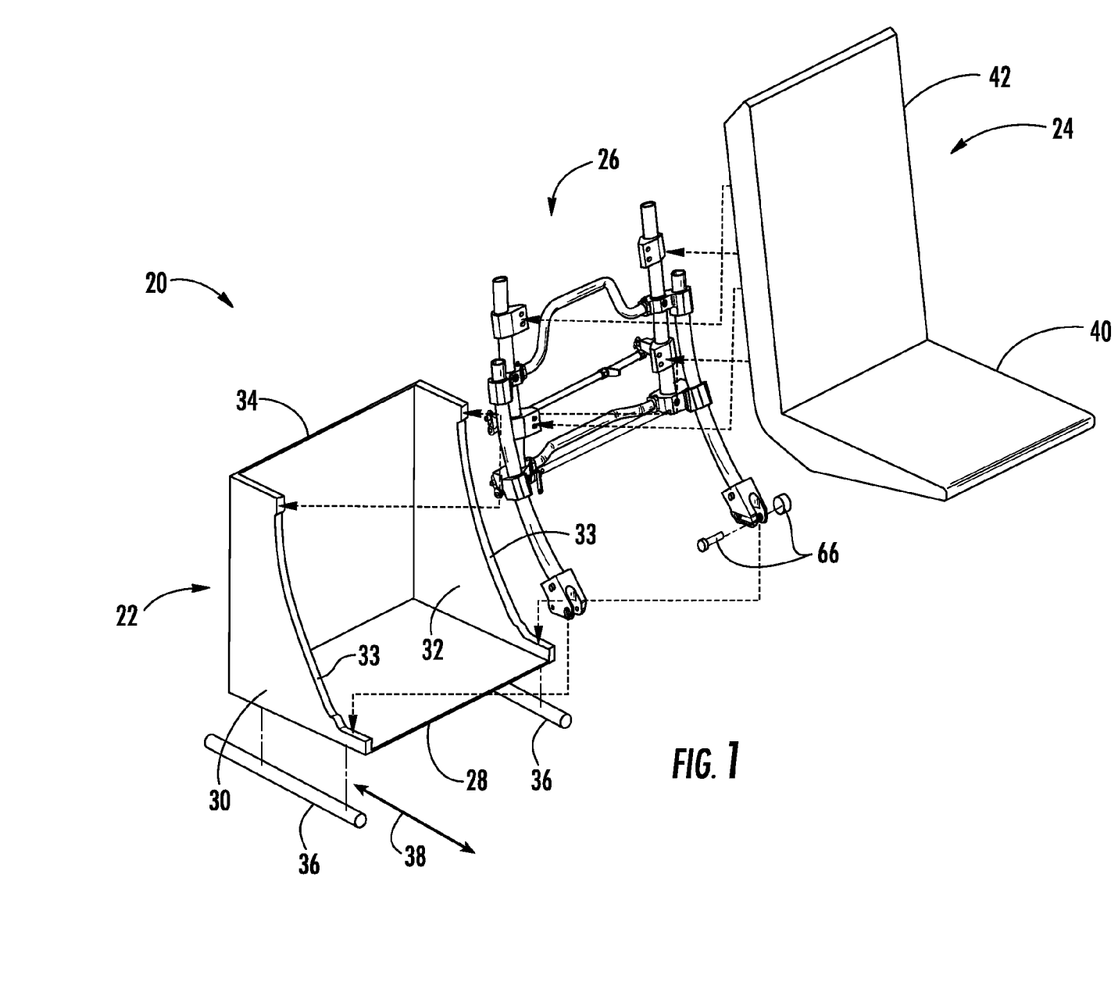
FIG. 1 is an exploded perspective view of an adjustable seat assembly as one, non-limiting, exemplary embodiment of the present disclosure.

Referring to FIG. 1, an exemplary embodiment of an adjustable seat assembly 20 may include a base 22, a bucket seat 24 and an articulating seat adjustment mechanism 26 located there-between. A non-limiting example of an application for the assembly 20 may be for helicopter pilots. However, additional applications for the seat assembly 20 may include automobiles, marine vehicles, airplanes and others.

The base 22 of the seat assembly 20 may generally be an enclosure that, with the bucket seat 24, substantially encases the seat adjustment mechanism 26. The base 22 may include a bottom panel 28, opposing side panels 30, 32, and a back panel 34. Leading edges 33 of the side panels 30, 32 may generally be contoured to fit closely to the bucket seat 24 while permitting adjustment of the seat via the seat adjustment mechanism 26. The base 22 may further have tracks 36 engaged between, for example, the floor of a helicopter, or other vehicle, and the bottom panel 28 facilitating forward and aft movement of the base 22 (and the connected adjustment mechanism 26 and bucket seat 24) in a direction 38. The seat occupant may move and adjust the base 22 position along direction 38 via traditional lever and engagement devices (not shown).

Figure 2:
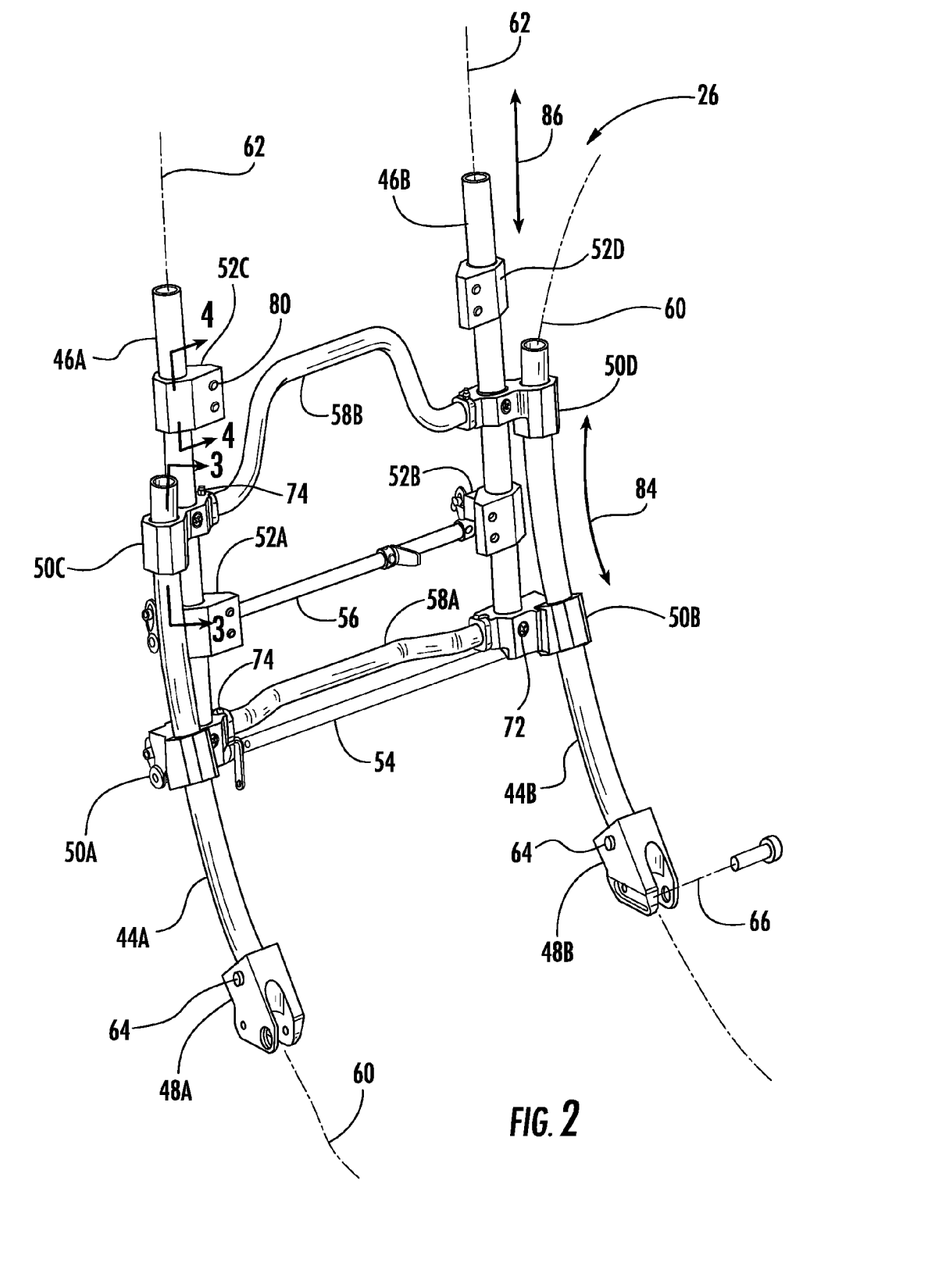
FIG. 2 is a perspective view of a seat adjustment mechanism of the assembly.

Referring to FIGS. 1 and 2, the bucket seat 24 may, in one embodiment, generally be formed as a single piece having a bottom portion 40 and a back portion 42 substantially projecting upward from a rear edge of the bottom portion 40. The illustrated seat adjustment mechanism 26 includes two tilt columns 44A, 44B that may be elongated and laterally spaced from one-another, two lift columns 46A, 46B that may also be elongated and laterally spaced from one-another, two connector fittings 48A, 48B, four tilt slider blocks 50A, 50B, 50C, 50D, four lift slider blocks 52A, 52B, 52C, 52D, a tilt sync rod 54, a lift sync rod 56, and two cross braces 58A, 58B. Of course, additional columns, blocks, rods and braces may be included. The tilt columns 44A, 44B may be tubular and arcuate extending, at least in-part, along respective curved centerlines 60 each having a constant or consistent radius of curvature (see arrow R in FIG. 3). In general, the concave side of both tilt columns 44A, 44B may face substantially forward (e.g., in the forward direction of the vehicle). The lift columns 46A, 46B may be tubular and extend substantially linearly along respective centerlines 62. The centerlines 60, 62 are generally parallel to one-another, and motion along the centerline 62 may be substantially tangential to motion along the centerline 60.

The connector fittings 48A, 48B facilitate a detachable and rigid connection of the seat adjustment mechanism 26 to the base 22. Each fitting 48A, 48B may include a first fastener 64 for detachably connecting the fittings to the lower ends of the respective tilt columns 44A, 44B, and a second fastener 66 for detachably connecting the fittings to the respective sides 30, 32 of the base 22. As one, non-limiting, example, such fasteners may include a threaded bolt inserted through holes located in the fittings, columns and base sides.

Figures 3, 4:
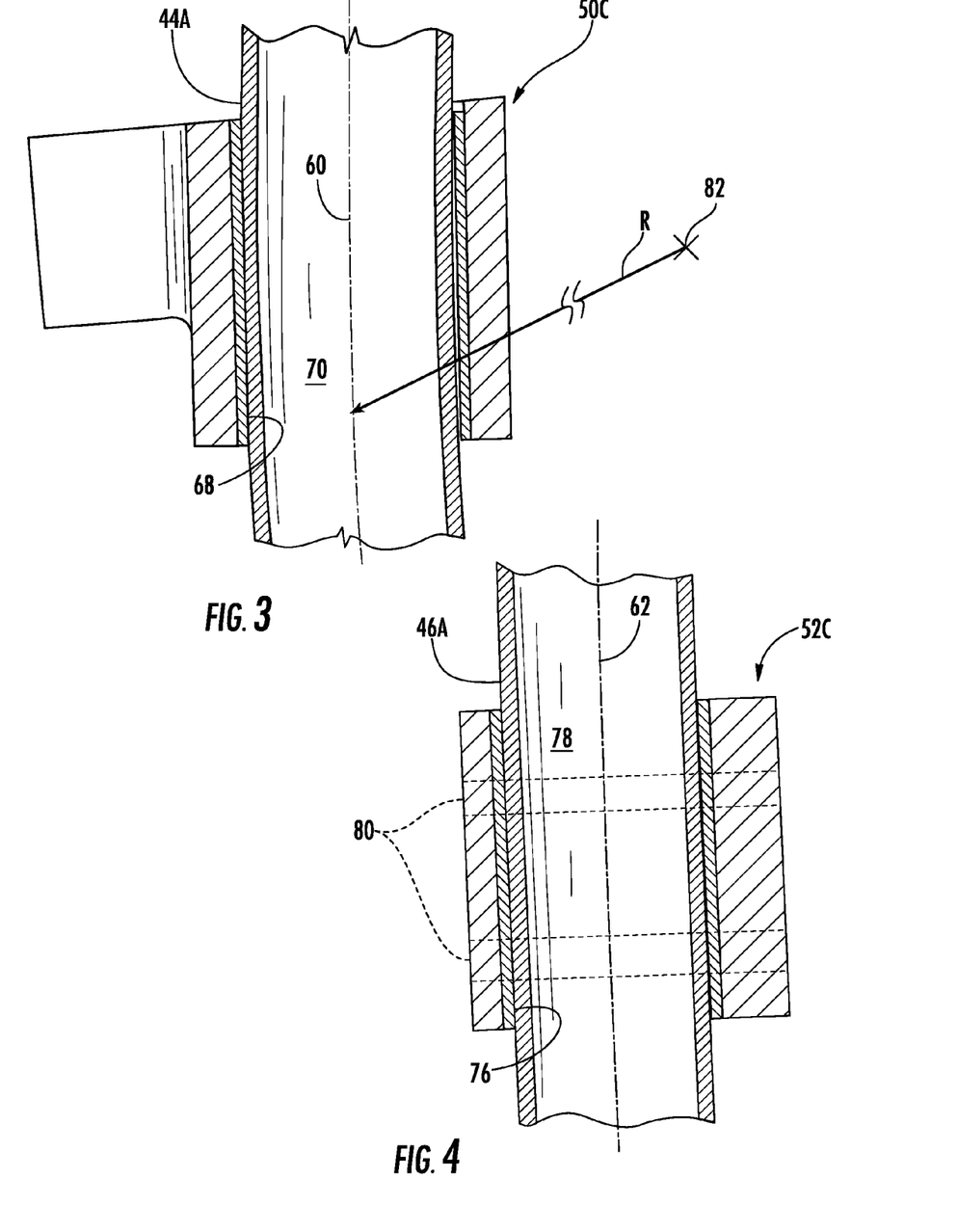
FIG. 3 is a cross section of a tilt slider block of the mechanism taken along arrows 3-3 of FIG. 2.
FIG. 4 is a cross section of a lift slider block of the mechanism taken along arrows 4-4 of FIG. 2.

Referring to FIGS. 2 and 3, the tilt slider blocks 50A, 50B, 50C, 50D are slideably engaged to the respective tilt columns 44A, 44B, and rigidly engaged to respective lift columns 46A, 46B. Each tilt slider block may include an anti-friction sleeve 68 that generally defines the boundaries of a bore 70 communicating through each tilt slider block 50A, 50B, 50C, 50D. The bore 70 is substantially centered about the centerline 60 thereby having an arcuate shape. The tilt column 44A extends through the bores 70 of the blocks 50A, 50C, and the tilt column 44B extends through the bores 70 of the blocks 50B, 50C. For structural integrity and smooth travel, block 50A is spaced axially from block 50C with respect to centerline 60, and block 50B is spaced axially away from block 50D with respect to centerline 60. Blocks 50A, 50B are rigidly attached to and interconnected via cross brace 58A, and blocks 50C, 50D are rigidly attached to and interconnected via cross brace 58B.

The tilt slider blocks 50A, 50B facilitate one or more of: a sliding attachment to the respective tilt columns 44A, 44B; detachable and rigid engagement to the cross brace 58A; and, detachable and rigid engagement to the respective lift columns 46A, 46B. Similarly, the tilt slider blocks 50C, 50D facilitate one or more of: a sliding attachment to the respective tilt columns 44A, 44B; detachable and rigid engagement to the cross brace 58B; and, detachable and rigid engagement to the respective lift columns 46A, 46B. Each tilt slider block 50A, 50B, 50C, 50D may include a first fastener 72 (also see FIG. 6) for detachably connecting them to the respective lift columns 46A, 46B, and a second fastener 74 for detachably connecting them to the respective braces 58A, 58B. As one, non-limiting, example, such fasteners may include a threaded bolt inserted through indexing holes located in the blocks, columns and braces.

Referring to FIGS. 2 and 4, the lift slider blocks 52A, 52B, 52C, 52D are slideably engaged to the respective lift columns 46A, 46B, and rigidly engaged to back portion 42 of the bucket seat 24. Each lift slider block may include an anti-friction sleeve 76 that generally defines the boundaries of a bore 78 communicating through each lift slider block. The bore 78 is substantially centered about the centerline 62, thereby having a substantially cylindrical and axially linear shape. The lift column 46A extends through the bores 78 of the blocks 52A, 52C, and the lift column 46B extends through the bores 78 of the blocks 52B, 52D. For structural integrity and smooth travel, block 52A is spaced axially from block 52C along centerline 62, and block 52B is spaced axially away from block 52D along centerline 62.

The lift slider blocks 52A, 52B facilitate a sliding attachment to the respective lift columns 46A, 46B, and detachable and rigid engagement to the back portion 42 of the bucket seat 24. Each lift slider block 52A, 52B, 52C, 52D may include at least one fastener 80 for detachably connecting the blocks to the bucket seat 24. As one, non-limiting example, such fasteners may include a threaded bolt inserted through holes located in the blocks and into threaded holes located in the back side of the back portion 42 of the bucket seat 24.

In operation, the seat adjustment mechanism 26 provides two degrees of motion. The first is a pivoting motion of the bucket seat 24, which generally pivots about a center point 82 (see FIG. 3) as the tilt slider blocks 50A, 50B, 50C, 50D slide along the curved tilt columns 44A, 44B in a arcuate or curved direction (see arrow 84 in FIG. 2). The second degree of motion moves the bucket seat 24 in a substantially linear direction (see arrow 86 in FIG. 2) that is generally tangential to the direction 84, and may be substantially vertical. The motion in direction 86 is facilitated by the lift slider blocks 52A, 52B, 52C, 52D that slide along the substantially straight lift columns 46A, 46B.

Figure 5:
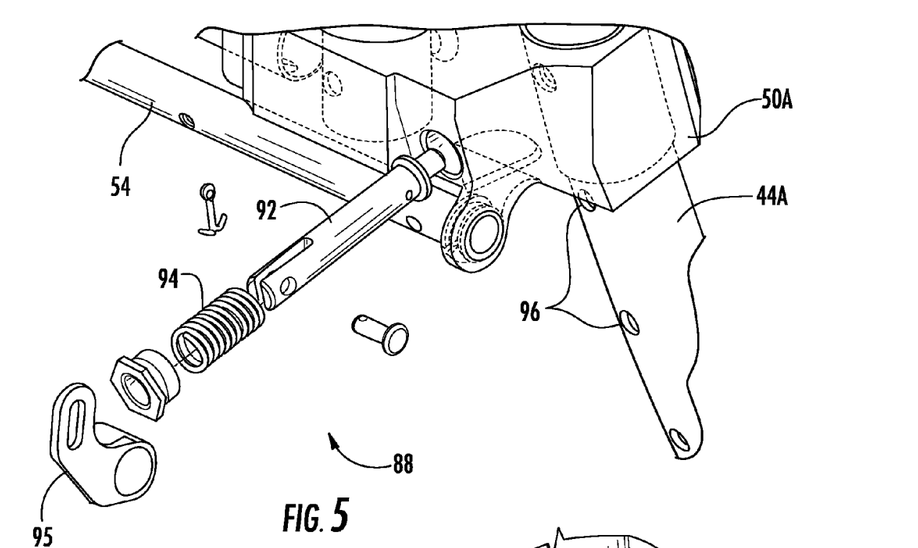
FIG. 5 is an exploded perspective view of a tilt indexing feature of the mechanism.
Figure 6:
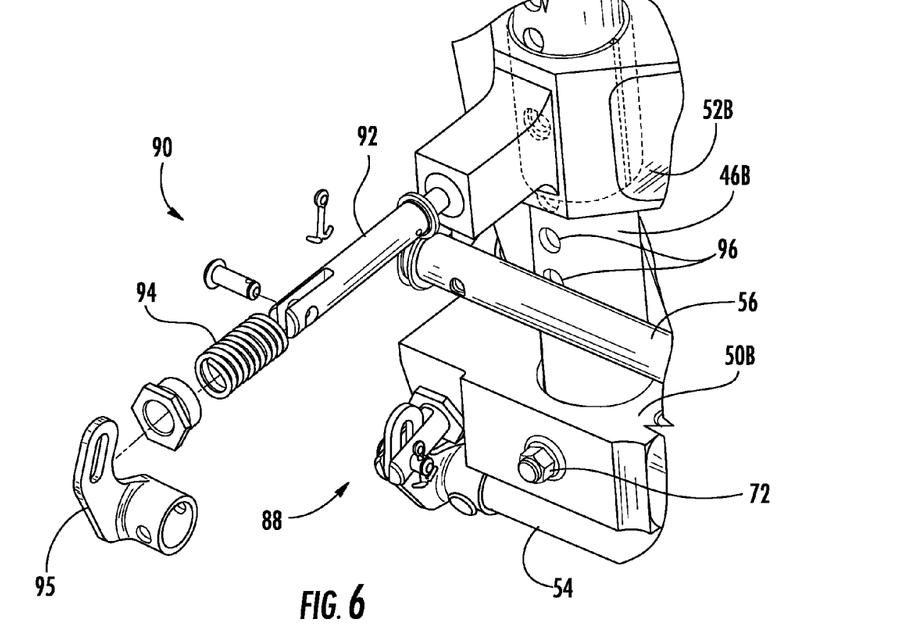
FIG. 6 is an exploded perspective view of a lift indexing feature of the mechanism.

Referring to FIGS. 2 and 5-6, the seat adjustment mechanism 26 may further include two tilt indexing features 88 that may be carried by and/or integrated into the respective tilt slider blocks 50A, 50B and tilt columns 44A, 44B, and two lift indexing features 90 integrated into the respective lift slider blocks 52A, 52B and lift columns 46A, 46B. Each of the indexing features 88, 90 may include a pin 92 biased by a spring 94 into a selected hole 96 of the respective tilt and lift columns 44A, 44B, 46A, 46B.

The tilt sync rod 54 is rotationally supported at opposite ends by the respective tilt slider blocks 50A, 50B and operatively attached to the respective indexing features 88. This operative attachment may be facilitated by an armature or cam 95 of each indexing feature 88 projecting radially outward from the respective ends of the rod 54. The attachment of the armature 95 to the rod 54 may be detachable via a traditional fastening means. Similarly, the lift sync rod 56 is rotationally supported at opposite ends by the respective lift slider blocks 52A, 52B and operatively attached to the respective indexing features 90. This operative attachment may be facilitated by additional armatures or cams 95 also used for the indexing features 90 and that project radially outward from the respective ends of the rod 56. The attachment of the armature 95 to the rod 56 may be detachable via traditional fastening means.

Figure 7:
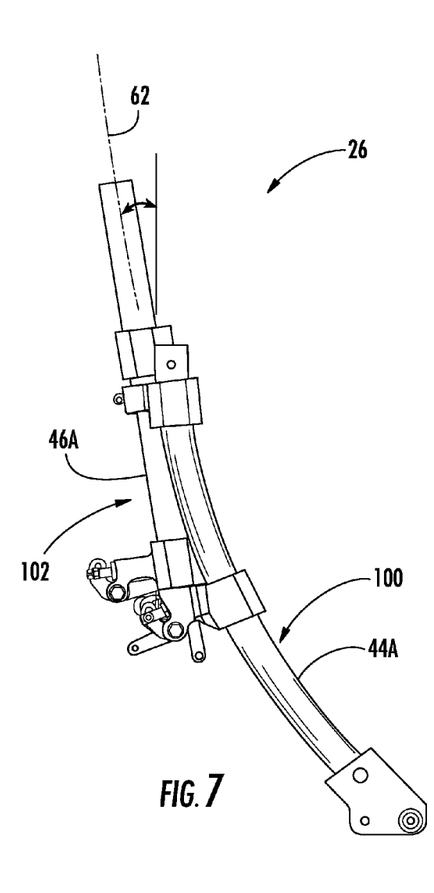
FIG. 7 is a side view of the mechanism in tilt neutral and lift down positions.
Figure 8:
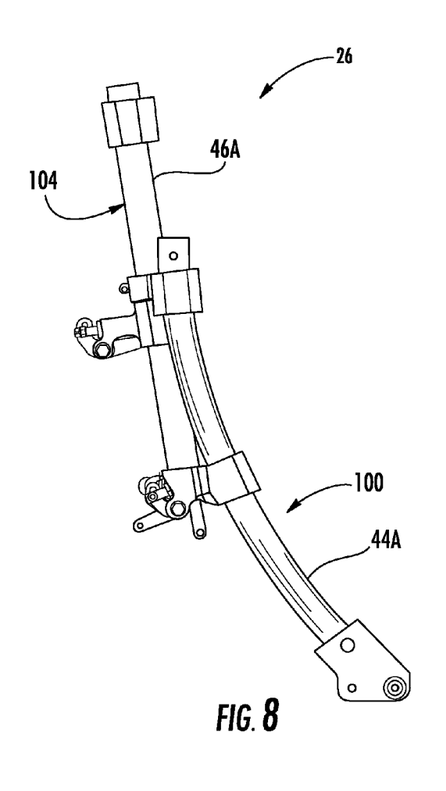
FIG. 8 is a side view of the mechanism in tilt neutral and lift up positions.
Figure 9:
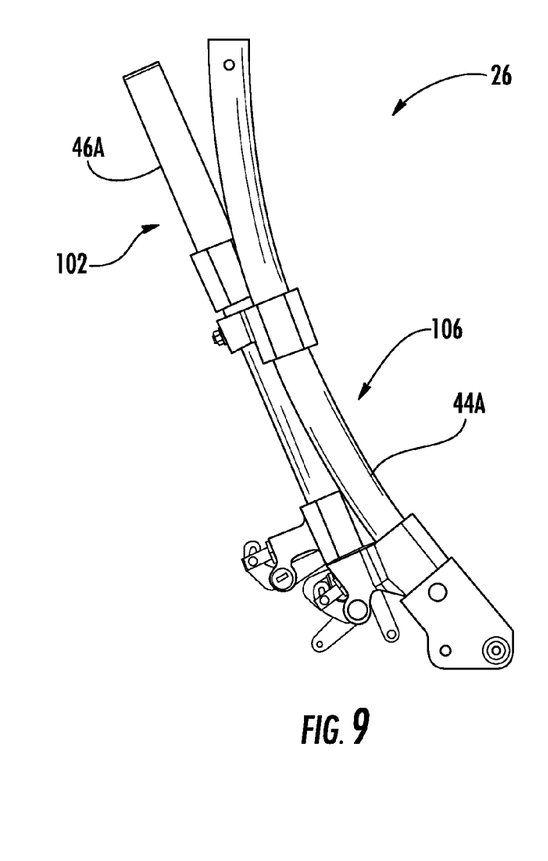
FIG. 9 is a side view of the mechanism in tilt down and lift down positions.
Figure 10:
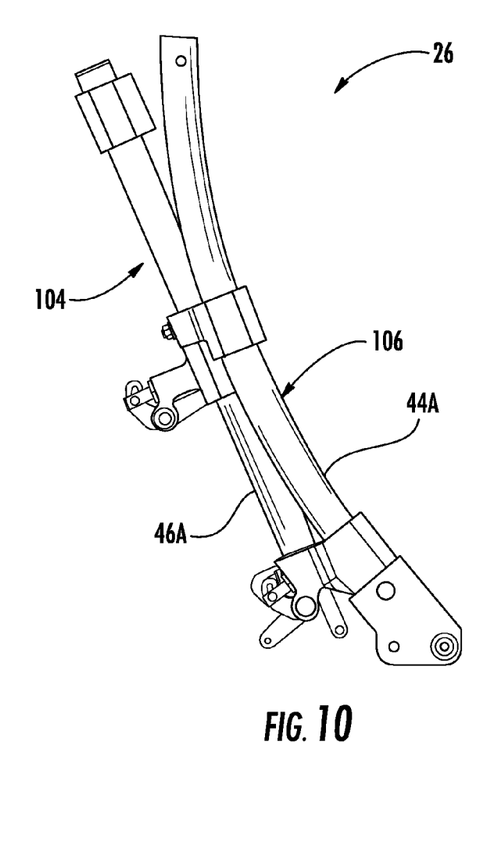
FIG. 10 is a side view of the mechanism in tilt down and lift up positions.

Referring to FIGS. 7 through 10, the seat adjustment mechanism 26 is adapted to move through a plurality of tilt positions while any pre-selected lift position remains the same; and, may move through a plurality of lift positions while any pre-selected tilt position remains the same. As best shown in FIG. 7, the mechanism 26 may be adjusted into a tilt neutral position 100 and a lift down position 102. As best shown in FIG. 8, the mechanism 26 may be adjusted into the tilt neutral position 100 and a lift up position 104. As best shown in FIG. 9, the mechanism 26 may be adjusted into a tilt down position 106 and the lift down position 102. And, as best shown in FIG. 10, the mechanism 26 may be adjusted into the tilt down position 106 and the lift up position 104.

As one, non-limiting, example and during operation, the lift column 46A may be about eight degrees from vertical (see arrow 108 in FIG. 7) when the tilt column is in the neutral position 100. The lift travel range along centerline 62 and in direction 86 may be about five inches (12.7 cm) with incremental, selectable, adjustments of about 0.5 inches (1.3 cm). The incremental adjustments are generally dictated by the hole 96 spacing in the lift columns 46A, 46B. The tilt travel range along curved centerline 60 and in direction 84 may be about fifteen degrees in about four equal and selectable increments as dictated by the hole 96 spacing in the tilt columns 44A, 44B.

When selecting a particular tilt position, a lever (not shown) may be actuated that rotates the tilt sync rod 54 in a first direction, which in-turn simultaneously drives the pins 92 (against the biasing force of the springs 94) of the indexing features 88 out of the holes 96 in the tilt columns 44A, 44B. The bucket seat 24 may then be tilted about center point 82 (see FIG. 3) causing the tilt slider blocks 50A, 50B, 50C, 50D to slide along the respective tilt columns 44A, 44B. When a desired tilt position is achieved, the lever is released and the biasing force of the springs 94 may rotate the sync rod 54 in the opposite direction as the pins 92 enter the nearest holes 96 to lock-in the chosen tilt position.

When selecting a particular lift position, a lever (not shown) may be actuated that rotates the lift sync rod 56 in a first direction, which in-turn simultaneously drives the pins 92 (against the biasing force of the springs 94) of the indexing features 90 out of the holes 96 in the lift columns 46A, 46B. The bucket seat 24 may then be lifted (i.e., moved substantially up or down) causing the lift slider blocks 52A, 52B, 52C, 52D to slide along the respective lift columns 46A, 46B. When the desired lift position is achieved, the lever is released and the biasing force of the springs 94 may rotate the sync rod 56 in the opposite direction as the pins 92 enter the nearest holes 96 to lock-in the chosen lift position.

As previously described, the tilt slider blocks 50A, 50B, 50C, 50D, the lift slider blocks 52A, 52B, 52C, 52D, and the connector fittings 48A, 48B may all be detachably engaged to adjacent components as opposed to more traditional welding techniques in such seat mechanism applications. This disengagement feature enables interchangeability of sub-components to suit specific applications, permits the use of dissimilar metals not possible in welded applications, and simplifies maintenance procedures and costs.

For example, the cross braces 58A, 58B which may be contoured to fit against and further support the back portion 42 of the bucket seat 24 may be easily interchanged without replacing the entire seat adjustment mechanism 26 when a different bucket seat is desired. Yet further, the tilt and lift slider blocks may be made of a lighter material such as aluminum, while the adjacent components or structural support framing is made of steel. In one example, the tilt columns 44A, 44B may be made of 4130 steel, the lift columns 46A, 46B may be made of 4340 steel, the slider blocks 50A-50D, 52A-52D may be made of 2024-T351 aluminum, the cross braces 58A, 58B may be made of 2024 aluminum, and the sync rods 54, 56 may be made of 6061-T6 aluminum.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A seat adjustment mechanism comprising:
   a first arcuate tilt column longitudinally extending along a curved centerline;
   a first lift column;
   a first tilt slider block detachably engaged to the first lift column and slideably engaged to the first arcuate tilt column for moving the first lift column relative to the first arcuate tilt column in a curved direction, along the curved centerline, and between a plurality of tilt positions; and
   a first lift slider block slideably engaged to the first lift column for moving along the first lift column between a plurality of lift positions independent of the plurality of tilt positions.

2. The seat adjustment mechanism set forth in claim 1, wherein the curved centerline has a consistent radius, and a bore in the first tilt slider block is centered to and co-extends along the curved centerline.

3. The seat adjustment mechanism set forth in claim 2 further comprising:
   a second tilt slider block spaced from the first tilt slider block along the first arcuate tilt column, wherein a bore in the second tilt slider block is centered to and co-extends along the centerline.

4. The seat adjustment mechanism set forth in claim 1 further comprising:
   a first indexing feature carried between the first tilt slider block and the first arcuate tilt column for positioning the first lift column in any one of the plurality of tilt positions.

5. The seat adjustment mechanism set forth in claim 4, wherein the first indexing feature includes a pin moveably supported by the first tilt slider block and a plurality of holes in and spaced along the first arcuate tilt column for selected receipt of the pin, and wherein each hole is associated with a respected one of the plurality of tilt positions.

6. The seat adjustment mechanism set forth in claim 4 further comprising:
   a second indexing feature carried between the first lift slider block and the first lift column for positioning the first lift slider block in any one of the plurality of lift positions.

7. The seat adjustment mechanism set forth in claim 6, wherein the second indexing feature includes a pin moveably supported by the first lift slider block and a plurality of holes in and spaced along the first lift column for selected receipt of the pin, and wherein each hole is associated with a respected one of the plurality of lift positions.

8. The seat adjustment mechanism set forth in claim 4 further comprising:
   a second arcuate tilt column laterally spaced from the first arcuate tilt column;
   a second lift column laterally spaced from the first lift column;
   a third tilt slider block detachably engaged to the second lift column and slideably engaged to the second arcuate tilt column for moving the second lift column between the plurality of tilt positions; and
   a cross brace detachably engaged between the first and third tilt slider blocks for stabilization of the first and second arcuate tilt columns.

9. The seat adjustment mechanism set forth in claim 4 further comprising:
   a second arcuate tilt column laterally spaced from the first arcuate tilt column;
   a second lift column laterally spaced from the first lift column;
   a third tilt slider block detachably engaged to the second lift column and slideably engaged to the second arcuate tilt column for moving the second lift column between the plurality of tilt positions;
   a third indexing feature carried between the third tilt slider block and the second arcuate tilt column for positioning the second lift column in any one of the plurality of tilt positions; and
   a sync rod supported by the first and third tilt slider blocks and operatively engaged to the first and third indexing features.

10. The seat adjustment mechanism set forth in claim 4 further comprising:
    a second arcuate tilt column laterally spaced from the first arcuate tilt column;
    a second lift column laterally spaced from the first lift column;
    a second lift slider block slideably engaged to the second lift column for moving between the plurality of lift positions independent of the plurality of tilt positions;
    a fourth indexing feature carried between the second lift slider block and the second lift column for positioning the second lift slider block in any one of the plurality of lift positions; and a sync rod supported by the first and second lift slider blocks and operatively engaged to the second and fourth indexing features.

11. The seat adjustment mechanism set forth in claim 1, wherein the tilt and lift slider blocks each include an anti-friction sleeve.

12. An adjustable seat assembly comprising:
a seat adjustment mechanism including a first arcuate tilt column, a first lift column, a first tilt slider block detachably engaged to the first lift column and slideably engaged to the first arcuate tilt column for moving the first lift column between a plurality of tilt positions, and a first lift slider block slideably engaged to the first lift column for moving between a plurality of lift positions independent of the plurality of tilt positions;
a bucket seat detachably engaged to the first lift slider block for moving between the plurality of lift positions and the plurality of tilt positions; and
a base constructed and arranged to move forward and aft, wherein the first arcuate tilt column is detachably engaged to and moves forward and aft with the base.

13. The adjustable seat assembly set forth in claim 12, wherein the assembly is a helicopter seat assembly.

14. The adjustable seat assembly set forth in claim 12, wherein movement of the first lift column between the plurality of tilt positions is in an arcuate direction, and movement of the first lift slider block between the plurality of lift positions is in a linear lift direction that is generally tangential to the arcuate direction.

15. The adjustable seat assembly set forth in claim 14, wherein movement of the base forward and aft is in a third direction that traverses the arcuate and lift directions.

16. The adjustable seat assembly set forth in claim 15, wherein the seat adjustment mechanism includes a first indexing feature carried between the first tilt slider block and the first arcuate tilt column for positioning the first lift column in any one of the plurality of tilt position, and a second indexing feature carried between the first lift slider block and the first lift column for positioning the first lift slider block in any one of the plurality of lift positions.

17. The adjustable seat assembly set forth in claim 16, wherein the seat adjustment mechanism includes a second arcuate tilt column laterally spaced from the first arcuate tilt column, a second lift column laterally spaced from the first lift column, a third tilt slider block detachably engaged to the second lift column and slideably engaged to the second arcuate tilt column for moving the second lift column between the plurality of tilt positions, a cross brace detachably engaged between the first and third tilt slider blocks for stabilization, a third indexing feature carried between the third tilt slider block and the second arcuate tilt column for positioning the second lift column in any one of the plurality of tilt positions, and a sync rod removeably supported by the first and third tilt slider blocks and operatively engaged to the first and third indexing features.

18. The adjustable seat assembly set forth in claim 17, wherein the slider blocks, the lift columns, the tilt columns and the cross brace are all made of dissimilar materials.

19. The adjustable seat assembly set forth in claim 16, wherein the seat adjustment mechanism includes a second arcuate tilt column laterally spaced from the first arcuate tilt column, a second lift column laterally spaced from the first lift column, a second lift slider block slideably engaged to the second lift column for moving between the plurality of lift positions independent of the plurality of tilt positions, a fourth indexing feature carried between the second lift slider block and the second lift column for positioning the second lift slider block in any one of the plurality of lift positions, and a sync rod supported by the first and second lift slider blocks and operatively engaged to the second and fourth indexing features.

20. The adjustable seat assembly set forth in claim 19, wherein the tilt columns are made of 4130 steel, the lift columns are made of 4340 steel, and the tilt and lift slider blocks are made of 2024-T351 aluminum.

\* \* \* \* \*